(12) United States Patent  (10) Patent No.: US 9,094,496 B2
Teutsch  (45) Date of Patent: Jul. 28, 2015

(54) SYSTEM AND METHOD FOR STEREOPHONIC ACOUSTIC ECHO CANCELLATION

(75) Inventor: Heinz Teutsch, Green Brook, NJ (US)

(73) Assignee: Avaya Inc., Basking Ridge, NJ (US)

( * ) Notice: Subject to any disclaimer, the term of this patent is extended or adjusted under 35 U.S.C. 154(b) by 334 days.

(21) Appl. No.: 12/896,639

(22) Filed: Oct. 1, 2010

(65) Prior Publication Data

US 2011/0311064 A1 Dec. 22, 2011

Related U.S. Application Data

(60) Provisional application No. 61/356,397, filed on Jun. 18, 2010.

(51) Int. Cl.
*H04R 5/00* (2006.01)
*H04M 9/08* (2006.01)
*H04R 3/00* (2006.01)

(52) U.S. Cl.
CPC .............. *H04M 9/082* (2013.01); *H04R 3/002* (2013.01)

(58) Field of Classification Search
CPC ........ H04R 5/027; H04R 3/005; H04N 5/225; H04S 1/00
USPC .......................... 381/26, 66, 1, 92, 56; 700/94
See application file for complete search history.

(56) References Cited

U.S. PATENT DOCUMENTS

| | | | | |
|---|---|---|---|---|
| 4,388,494 A | * | 6/1983 | Schone et al. | 381/1 |
| 5,206,910 A | * | 4/1993 | Hamada et al. | 381/26 |
| 5,473,701 A | * | 12/1995 | Cezanne et al. | 381/92 |
| 5,694,474 A | * | 12/1997 | Ngo et al. | 381/66 |
| 6,041,127 A | * | 3/2000 | Elko | 381/92 |
| 6,584,203 B2 | * | 6/2003 | Elko et al. | 381/92 |
| 6,865,275 B1 | * | 3/2005 | Roeck | 381/92 |
| 6,895,093 B1 | * | 5/2005 | Ali | 381/66 |
| 7,212,642 B2 | * | 5/2007 | Rasmussen | 381/313 |
| 7,848,529 B2 | * | 12/2010 | Zhang et al. | 381/92 |
| 8,098,844 B2 | * | 1/2012 | Elko | 381/94.1 |
| 8,103,030 B2 | * | 1/2012 | Barthel et al. | 381/313 |
| 8,433,076 B2 | * | 4/2013 | Zurek et al. | 381/92 |
| 2003/0147538 A1 | * | 8/2003 | Elko | 381/92 |
| 2004/0076301 A1 | * | 4/2004 | Algazi et al. | 381/17 |
| 2006/0115097 A1 | * | 6/2006 | Rasmussen | 381/92 |
| 2006/0182268 A1 | * | 8/2006 | Marton | 379/406.08 |
| 2006/0262939 A1 | * | 11/2006 | Buchner et al. | 381/56 |
| 2008/0212814 A1 | * | 9/2008 | Barthel et al. | 381/313 |

(Continued)

FOREIGN PATENT DOCUMENTS

JP 04144399 A * 5/1992 ............. H04R 5/027

*Primary Examiner* — Lun-See Lao (57) ABSTRACT

Disclosed herein are systems, methods, and non-transitory computer-readable storage media for stereophonic acoustic echo cancellation. The method includes collecting, at a same time, a first audio sample of an audio source from a first omnidirectional microphone and a second audio sample of the audio source from a second omnidirectional microphone. The method includes delaying the second audio sample by a first amount of time to yield a delayed second audio sample and combining the delayed second audio sample with the first audio sample to produce a first channel, then delaying the first audio sample by a second amount of time to yield a delayed first audio sample and combining the delayed first audio sample with the second audio sample to produce a second channel. Then the method includes outputting the first channel and the second channel as a stereo audio signal of the audio source.

18 Claims, 8 Drawing Sheets

(56) References Cited

U.S. PATENT DOCUMENTS

| | | | |
|---|---|---|---|
| 2008/0260175 A1* | 10/2008 | Elko | 381/73.1 |
| 2009/0003623 A1* | 1/2009 | Burnett | 381/92 |
| 2009/0003624 A1* | 1/2009 | Burnett | 381/92 |
| 2009/0003625 A1* | 1/2009 | Burnett | 381/92 |
| 2009/0003626 A1* | 1/2009 | Burnett | 381/92 |
| 2009/0268920 A1* | 10/2009 | Fan | 381/66 |
| 2011/0075850 A1* | 3/2011 | Par | 381/17 |

* cited by examiner

SYSTEM AND METHOD FOR STEREOPHONIC ACOUSTIC ECHO CANCELLATION

RELATED APPLICATIONS

This application claims priority to provisional U.S. Patent Application No. 61/356,397, filed 18 Jun. 2010, the contents of which are herein incorporated by reference in their entirety.

BACKGROUND

1. Technical Field

The present disclosure relates stereo recording and more specifically to acoustic echo control in stereo recording.

2. Introduction

Figure 2:
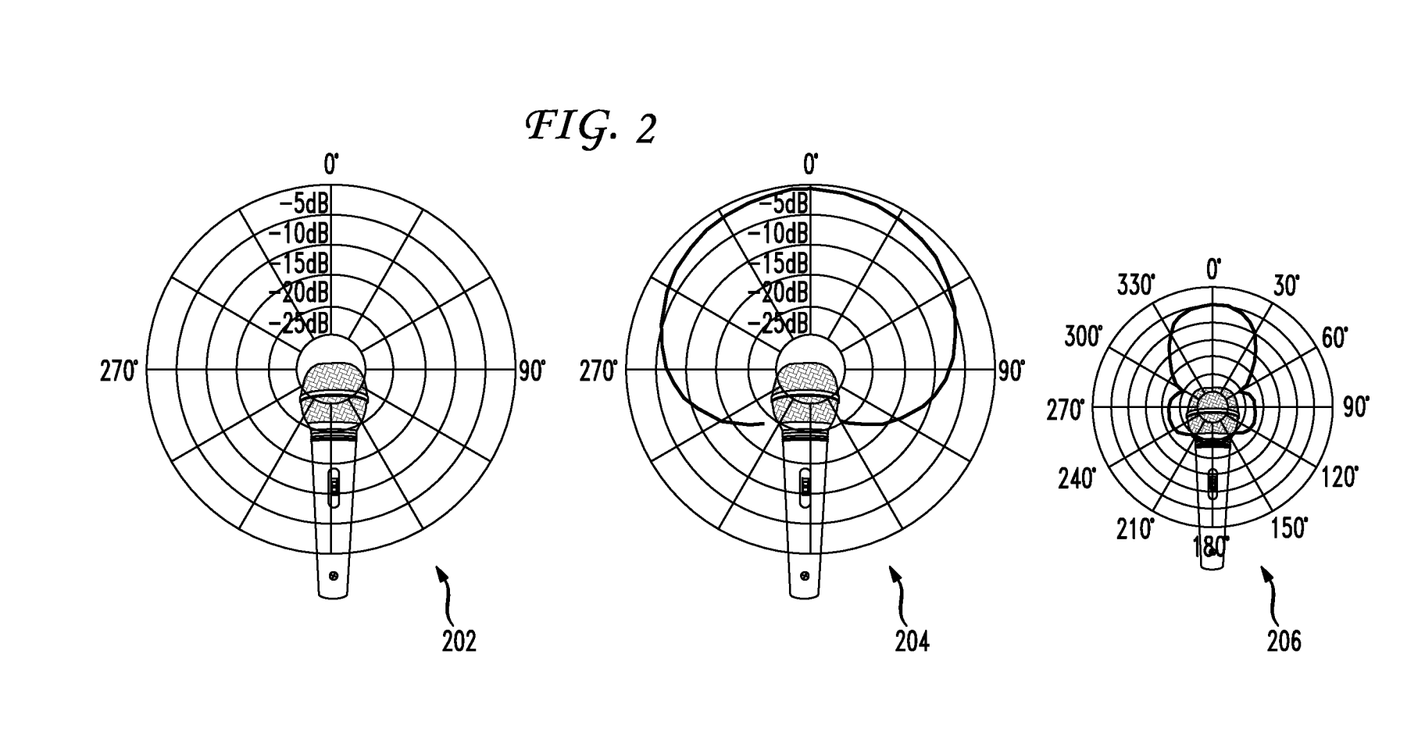
FIG. 2 illustrates three exemplary microphone polar patterns.

Traditional stereophonic capture of audio results in two highly correlated signals. FIG. 2 illustrates an example of different microphone types. An omnidirectional microphone 202 has a generally sphere-shaped sensitivity pattern. A cardioid microphone 204 is a form of unidirectional microphone with a generally heart-shaped sensitivity pattern. FIG. 2 also illustrates a third type of unidirectional microphone 206. The prior art approaches below are discussed in terms of these types of microphones.

Figure 3:
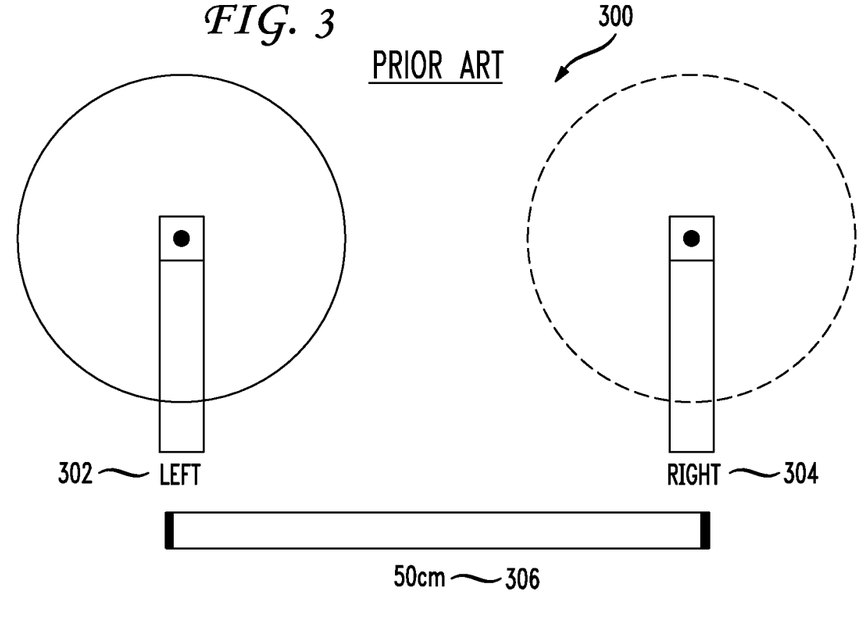
FIG. 3 illustrates a first prior art stereo recording technique.

The A/B technique 300 or time-of-arrival telephone approach, as shown in FIG. 3, captures stereophonic audio via a left omnidirectional microphone 302 and a right omnidirectional microphone 304 spaced far apart 306 one from another. An example distance is 50 centimeters. This approach has the advantage of using less expensive omnidirectional microphones, but the spacing requirements (i.e. tens of centimeters or more) render this stereophonic approach impractical for most telephony applications, especially in mobile devices where smaller is better.

Figure 4:
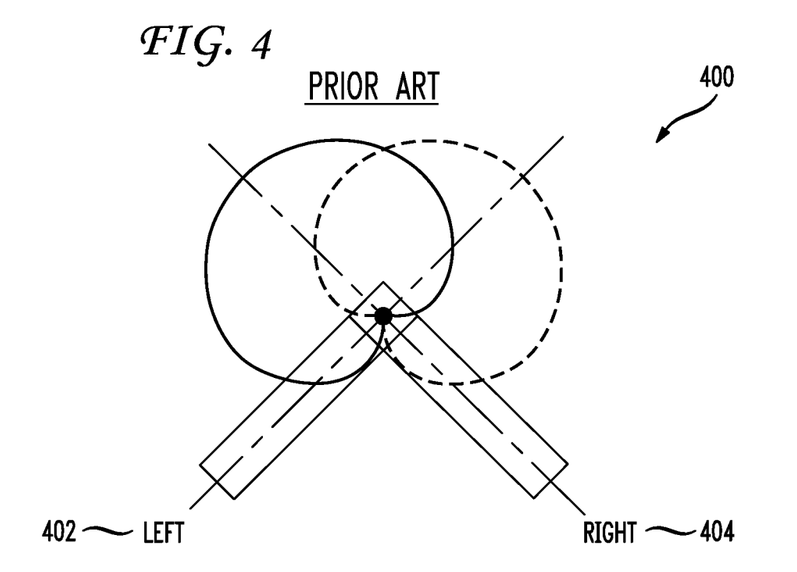
FIG. 4 illustrates a second prior art stereo recording technique.

The X/Y technique 400 or intensity stereophony approach, as shown in FIG. 4, captures stereophonic audio via left cardioid microphone 402 and a right cardioid microphone 404. Under this approach, true coincidence is quite hard to obtain in telephone housings. Further, cardioid microphones are several times more expensive than omnidirectional microphones.

In addition, these stereophonic approaches often introduce echoes that should be cancelled out to provide a more clean sound when sound is transmitted from one endpoint to another in a full-duplex fashion. Stereophonic acoustic echo cancellation requires a pre-processing step to decorrelate the loudspeaker signals in order for the adaptive filters to converge to a good solution. One way to decorrelate the signals is to non-linearly modify the signals or to apply time-varying all-pass filters. However, these pre-processing steps lead to audible distortion of the stereophonic signals and/or destruction of the spatial image originally captured by the stereophonic recording. Even state-of-the-art approaches distort the loudspeaker signals and/or destroy the original spatial image of the recorded acoustic space.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

At a high level, the disclosure herein relates to recording stereophonic audio by applying an algorithm to process input from two closely-spaced omnidirectional microphones to yield signals in a cardioid-like or similar pattern. The algorithm can be implemented in audio processing software, hardware (such as a digital audio processing chip), or a combination thereof.

In one aspect, a system configured to practice the method of stereophonic acoustic echo cancellation collects, at a same time, a first audio sample of an audio source from a first omnidirectional microphone and a second audio sample of the audio source from a second omnidirectional microphone. The system delays the second audio sample by a first amount of time to yield a delayed second audio sample and combines the delayed second audio sample with the first audio sample to produce a first channel. Then the system delays the first audio sample by a second amount of time to yield a delayed first audio sample and combines the delayed first audio sample with the second audio sample to produce a second channel. The first amount of time and the second amount of time can be equal. The system can combine audio signals by applying a spatial Fourier transform. The system outputs the first channel and the second channel as a stereo audio signal of the audio source.

The disclosure sets forth variations on this approach. For example, the first omnidirectional microphone and the second omnidirectional microphone can be closely spaced. One exemplary spacing distance is one centimeter. Because the distance between the microphones can be so short, the omnidirectional microphones can be integrated as part of a single desktop or mobile telephone housing. Further, the stereo audio signal can simulate a first-order pattern such as a cardioid pattern. The system can further audibly play the stereo audio signal via a first speaker and a second speaker.

The approaches set forth herein do not rely on an acoustic front-end for a dedicated decorrelation post-processing step. The stereo-like signals generated by two back-to-back cardioid patterns obtained via differential microphone array technology are sufficiently decorrelated to allow for stereophonic acoustic echo cancellation to be practical without the need to introduce potentially performance reducing pre-processing. The fundamental result of utilizing this sound capture technique is that no dedicated decorrelation step is required.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Using the approaches disclosed herein, the distance between two stereophonic recording microphones can be as small as 1 centimeter. The microphones can be closer or further apart than 1 centimeter as well. However, this vast decrease in required distance between the two microphones can lead to applications in many new fields, such as smartphones, handheld audio (and/or video) recorders, desktop phones, and other portable applications, in which a short distance between the two microphones is advantageous.

The approach described herein can be performed alone or in conjunction with previous approaches to stereo and mono audio recording. The processing can be performed in a dedicated piece of hardware and/or via software executing on a general-purpose processor. The microphones used to capture the audio can be of a same type or can be different types. For example, one microphone can be more sensitive than the other. Further, some microphone patterns include unidirectional, omnidirectional, subcardioid, cardioid, supercardioid, bidirectional, hypercardioid, and shotgun. In one embodiment, the approach set forth herein is practiced via two closely-spaced omnidirectional microphones. The system can then take the input from those two microphones and create truly coincident cardioid-like spatial characteristics.

Figure 1:
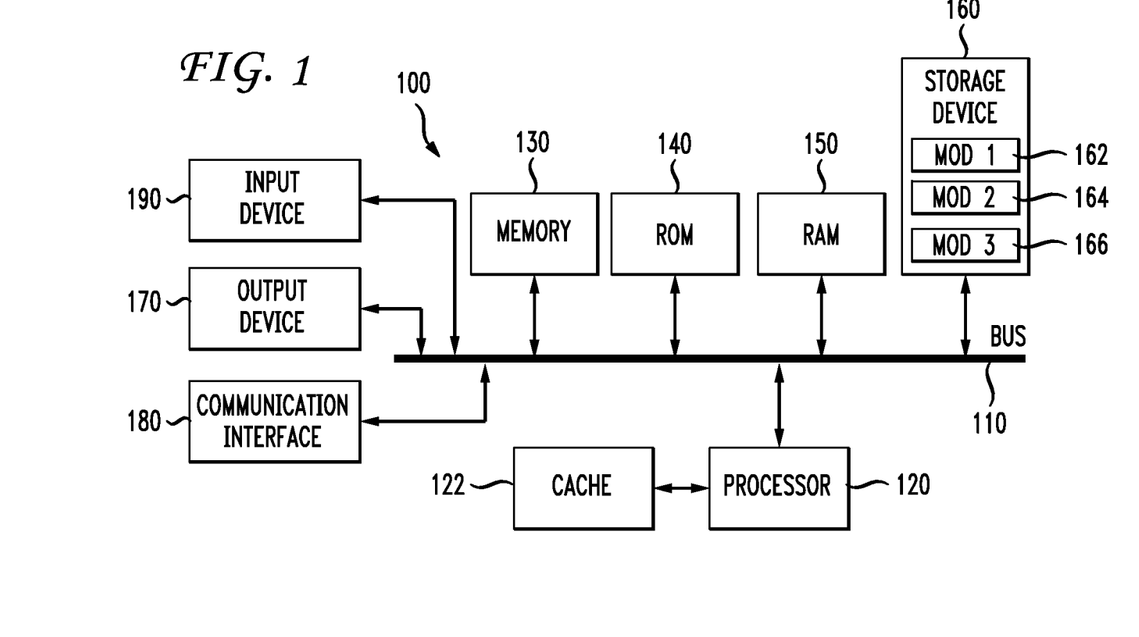
FIG. 1 illustrates an example system embodiment.

The disclosure first discusses various components of an exemplary computing system, as shown in FIG. 1, which can be configured to implement the principles disclosed herein. The disclosure then returns to a more detailed discussion of stereophonic recording techniques, cardioid spatial patterns, and the exemplary method embodiment. The disclosure now turns to FIG. 1.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

The disclosure now returns to a discussion of stereophonic acoustic echo cancellation. This disclosure discusses first-order differential microphone arrays, however a generalization to higher-order differential microphone arrays is straight forward. The approaches using a first-order differential microphone array set forth herein can replace the known approach of capturing spatial sound with two microphones via coincidence stereophony where two cardioid microphones are placed such they almost touch each other while observing a $\pi/2$ relative rotation in look direction.

Figure 5:
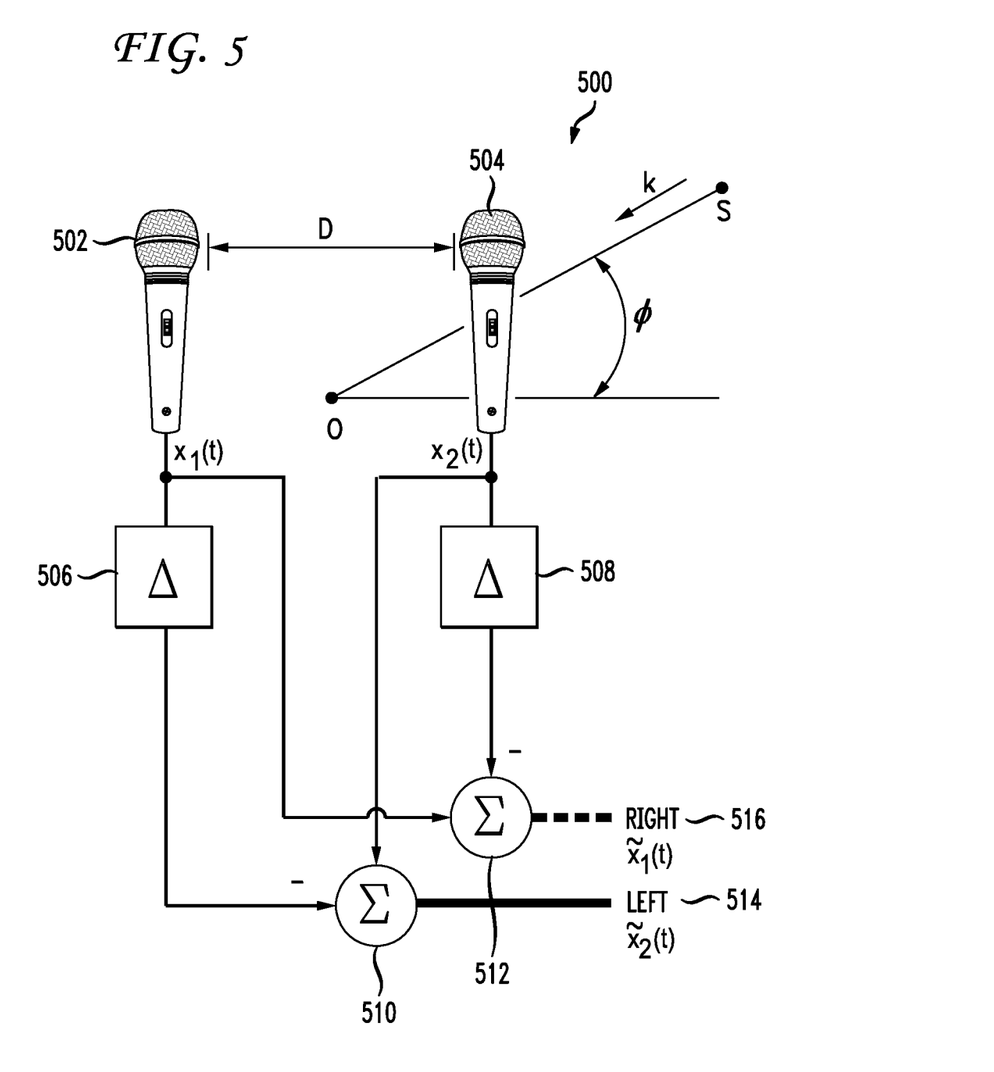
FIG. 5 illustrates an exemplary stereo recording technique.
Figure 8:
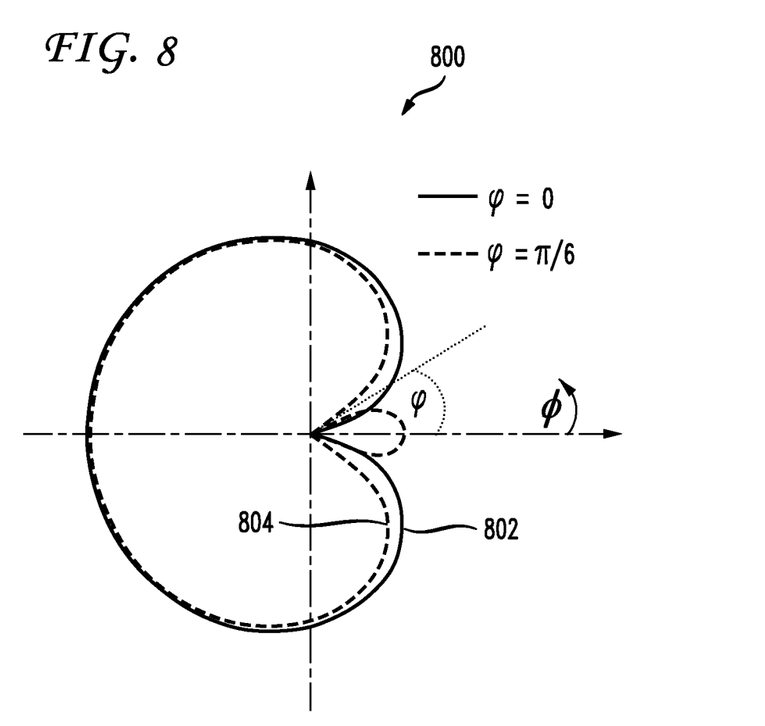
FIG. 8 illustrates an exemplary stereophonic capture using first-order differential microphone arrays.

Any first-order differential microphone response, such as a microphone that exhibits dipole, cardioid, and supercardioid characteristics, can be generated by appropriately combining the output of two closely spaced omnidirectional microphones into two mirror-symmetric cardioid patterns. FIG. 5 illustrates the geometry. The source S emits a plane-wave signal with wave number $k=|k|=\omega/c$, where c is the speed of sound, from direction $\phi$ with respect to the array center, O. It can be further assumed, for the sake of simplicity, that the source S is placed in an anechoic environment, i.e. $G_1(\omega)=G_2(\omega)=1$. Then, the two output signals of the first-order differential microphone array can be written using the equations below:

$$\tilde{X}_1(\omega)=S(\omega)[e^{idk/2 \cos \phi}e^{-i(\omega T+kd/2 \cos \phi)}] \quad \text{Equation 1}$$

$$\tilde{X}_2(\omega)=S(\omega)[e^{idk/2 \cos \phi}e^{-i(\omega T-kd/2 \cos \phi)}] \quad \text{Equation 2}$$

where the delay $T=d/c\cdot\cos\omega$ is chosen to produce a desired cardioid pattern. For instance, FIG. 8 illustrates the directivity patterns 800 associated with $\tilde{x}_2(t)$ of two examples for such cardioids. The first cardioid pattern 802 is created using $\phi=0$. $\phi=11\pi/36$ produces a supercardioid, not shown. The second cardioid pattern 804 is created using $\phi=\pi/6$ to produce a pattern somewhat between a cardioid and a supercardioid. The respective directivity pattern of $\tilde{x}_1(t)$ has been omitted for clarity, but can be easily visualized by flipping the pattern of $\tilde{x}_2(t)$ around the vertical axis. By using these two mirror symmetric cardioid patterns as the left and right channel, a sound field can be captured spatially.

One way to measure signal correlation is the Pearson correlation coefficient. For two variables A and B, the Pearson correlation coefficient is defined by the equation below:

$$\rho(A,B) = \frac{\text{cov}(A,B)}{\sigma_A \sigma_B} \quad \text{Equation 3}$$

where 'cov' denotes the covariance of the two variables and $\sigma$ is the standard deviation. The correlation coefficient assumes values between $-1$ and 1, the two extremes implying a linear relationship between the two variables A and B.

The decorrelation property of differential microphone arrays is further explored by means of measurements and performance evaluations of a real-time stereophonic acoustic echo cancellation implementation. Due to restricted measurement capabilities in terms of a reproducible full angular measurement of the correlation coefficient, the decorrelation property of differential microphones is demonstrated by evaluating coherence. The coherence between signals $x_1$ and $x_2$ is defined by the following equation:

$$\gamma_{x1x2}(f) = \frac{|S_{x1x2}(f)|}{\sqrt{S_{x1x1}(f)S_{x2x2}(f)}} \quad \text{Equation 4}$$

where $S_{x1x2}$ denotes the cross-spectral density between $x_1$ and $x_2$. $S_{x1x1}$ and $S_{x2x2}$ are the autospectral densities of $x_1$ and $x_2$, respectively.

For test measurements, two omnidirectional microphones found in standard telephony equipment and rated for wideband speech signals were deployed and sampled at $f_s=32$ kHz. The spacing was chosen as $d=0.015$ m to minimize spatial aliasing at higher frequencies. To avoid potential introduction of nonlinearities in the measurements, the preamplifier, A/D converter and soundcard used were of studio-grade quality. All measurements were performed in an acoustically untreated office of roughly 3.5×4.5 m.

Test data shows that the coherence between the two processed microphone signals is significantly less than between the unprocessed ones. Even for $\phi \approx \pi/2$ the coherence is less than unity mostly due to the fact that the microphones were not calibrated such that "ideal" cardioids cannot be expected. However, subjective listening test have suggested that the spatial representation offered by this arrangement, even though uncalibrated, is more than adequate for telephony applications.

In order to show that the decorrelation property offered by the differential microphone array is sufficient and suitable for stereophonic acoustic echo cancellation, the performance of a real-time stereophonic acoustic echo cancellation system outfitted with back-to-back cardioid recording capabilities is compared to a monophonic acoustic echo cancellation system that uses the same exact setup but with only one microphone and one loudspeaker. Both echo cancellers are based on a frequency-domain adaptive filtering method. The length of the adaptive filter is $L=1024$ samples at a sampling rate of $f_s=16$ kHz.

The first performance measure, assuming an interference-free acoustic environment, is the mean-square error (MSE) defined be the equation below:

$$MSE(n) = \frac{E\{|e(n)|^2\}}{E\{|y(n)|^2\}} \quad \text{Equation 5}$$

where the symbol E{ } denotes expectation and n is the discrete time index. The second performance measure is the impulse response misalignment defined as the following equation:

$$\in_v (n) = \frac{\|h_v - \hat{h}_v(n)\|}{\|h_v\|}, v = 1, 2, \quad \text{Equation 6}$$

where the discretized and truncated actual room impulse response $h_v = [h_{v,0} \ h_{v,1} \ldots h_{v,L-1}]^T$ is assumed to be time-invariant during the course of the measurements and $hv(n) = [h_{v,0}(n) \ h_{v,1}(n) \ldots h_{v,L-1}(n)]^T$.

With some sets of test data, the stereophonic acoustic echo cancellation approach adapts somewhat slower than the monophonic acoustic echo cancellation and the misalignment is somewhat larger, however the stereophonic acoustic echo cancellation approach does converge to a viable solution.

FIG. 5 illustrates an exemplary stereo recording technique 500. A first omnidirectional microphone 502 and a second omnidirectional microphone 504 feed to a left channel 514 and a right channel 516. The first microphone 502 feeds a signal to a delay module 506 which introduces a delay in the signal before combining the delayed signal with the signal from the second microphone 504 via a combining module 510 to produce the left channel 514. Similarly, the second microphone 504 feeds a signal to a delay module 508 which introduces a delay in the signal before combining the delayed signal with the signal from the first microphone 502 to produce the right channel 516. The delay modules and/or the combining modules can be incorporated into a single module that accepts multiple inputs and can provide multiple outputs. The amount of delay introduced by the delay modules can vary to produce different spatial characteristics. For example, FIG. 6 illustrates a first cardioid spatial pattern 602 produced by one amount of delay and a second cardioid spatial pattern 604 produced by a different amount of delay.

Figure 6:
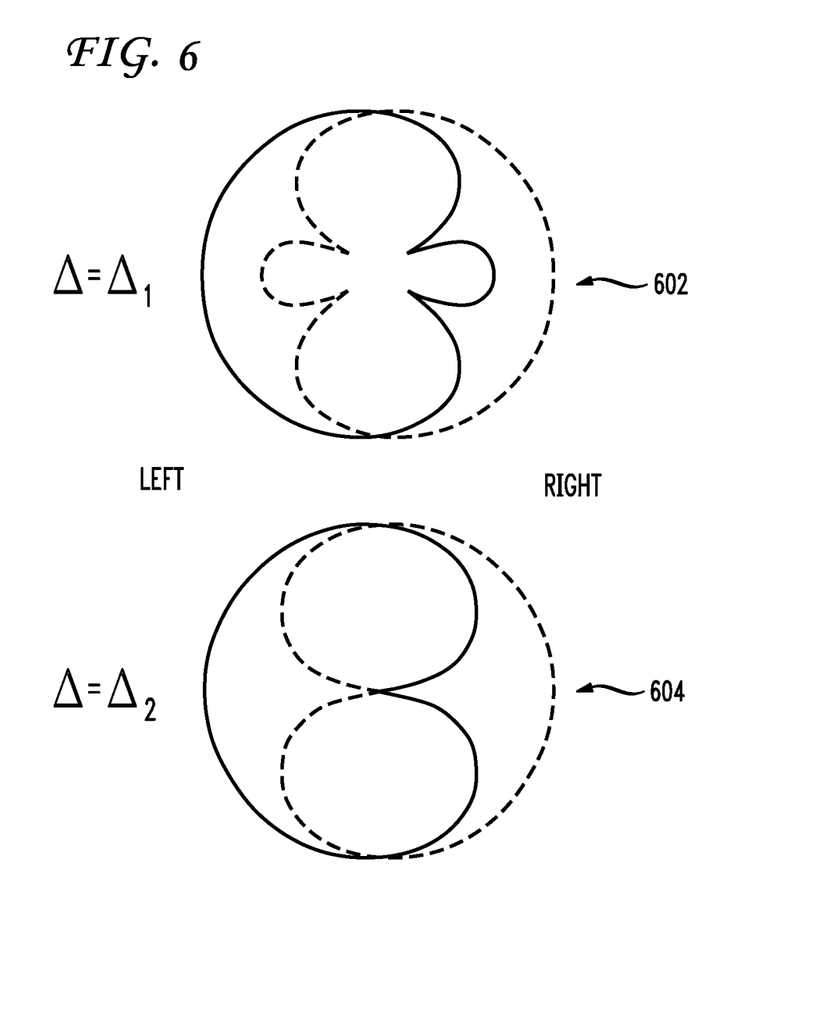
FIG. 6 illustrates two exemplary cardioid spatial patterns.

The back-to-back cardioid arrangement can provide inherent signal decorrelation, as shown in FIG. 6. Decorrelation properties of this recording technique are described below. Any first-order pattern, such as a cardioid pattern, can be obtained by combining microphones that exhibit omnidirectional and dipole characteristics. These characteristics can be obtained by applying a spatial Fourier transform of length two, for example, to a pair of closely spaced omnidirectional microphones. Here, the two patterns are generated simultaneously. The first pattern is generated where the highest sensitivity (main lobe) points in one direction. The second pattern is generated where the main lobe point into another, e.g. the opposite direction, to be able to record a spatial sound field. The resulting Fourier coefficients correspond to a DC, or omnidirectional, component and an AC, or dipole, component. The Fourier coefficients are orthogonal. The two back-to-back cardioid patterns, or the stereo microphone, can be obtained by appropriately combining these orthogonal components. The resulting stereo microphone does not produce highly correlated, or coherent, signals for any but one single direction-of-arrival (i.e. source-microphone geometry) of the source to be recorded. The measureable coherence between the two microphone signals due to a source impinging from that particular direction-of-arrival does not lead to any practical limitations.

Figure 7:
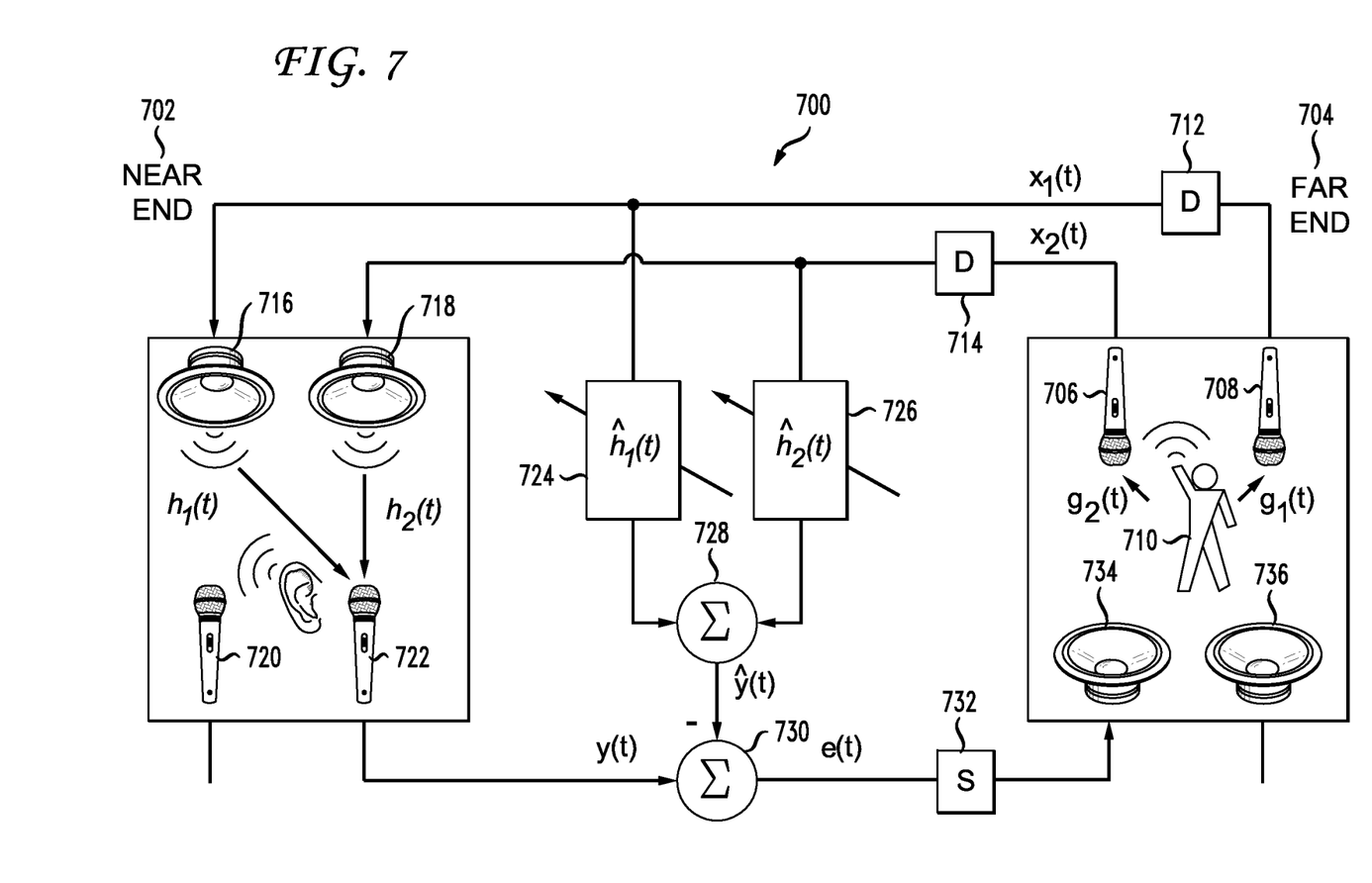
FIG. 7 illustrates an exemplary stereophonic acoustic echo control system.

FIG. 7 illustrates an exemplary stereophonic acoustic echo control system 700. This system illustrates both a near end 702 and a far end 704. Systems that employ only one microphone and try to derive a spatial image from monophonic signals are not discussed here. Likewise, systems that rely solely on echo suppression, i.e. without the use of linear adaptive filtering, are not discussed here. The near end 702 and far end 704 can be parts of a single system or can include components from various separate systems such as a cellular phone and a video conference appliance that communicate with each other. In this example, the far end 704 includes two omnidirectional microphones 706, 708 that record audio from an audio source 710 such as a human being in a telephone call. In the prior art, each microphone connects to a channel decorrelation module 712, 714. The recording techniques disclosed herein render the channel decorrelation modules 712, 714 redundant and unnecessary. Therefore, each microphone connects to the near end 702 speakers 716, 718 without a channel decorrelation module 712, 714 to produce a stereo signal output for a listener. One or both of microphones 720, 722 pick up the stereo signals at the near end 702. The signal received by the microphone 722 can be described by the following equation:

$$y(t) = h_1(t)^* x_1(t) + h_2(t)^* x_2(t), \quad \text{Equation 7:}$$

where * denotes convolution. The signal path attached to microphone 720 is omitted for clarity.

Assuming that the audio source 710 is the only active audio source in the far end 704, the adaptive filters 724, 726 estimate the loudspeaker-room-microphone impulse responses in the near end 702, $h_1(t)$ and $h_2(t)$, and subtract the filtered reference signals, $x_1(t)$ and $x_2(t)$, from the recorded microphone signal, y(t), as shown by the equation below:

$$e(t) = y(t) - \hat{h}_1(t)^* x_1(t) - \hat{h}_2(t)^* x_2(t)$$

$$e(t) = \tilde{h}_1(t)^* x_1(t) + \tilde{h}_2(t)^* x_2(t) \quad \text{Equation 8:}$$

where $\tilde{h}(t)_v \triangleq h(t)_v - \hat{h}(t)_v$ and v=1, 2

The task for stereophonic acoustic echo cancellation is to drive the error signal, e(t), to zero or as close to zero as is possible or reasonable feasible, as shown by the following equation:

$$\tilde{h}_1(t)^* x_1(t) + \tilde{h}_2(t)^* x_2(t) = 0 \quad \text{Equation 9:}$$

There is no unique solution to this problem because the spectrum of the two microphone signals $X_1(\omega)$ and $X_2(\omega)$ are linearly dependent, as shown by the equation:

$$X_1(\omega) G_2(\omega) = X_2(\omega) G_1(\omega) \quad \text{Equation 10:}$$

where $G_1(\omega)$ and $G_2(\omega)$ are the Fourier transforms of the loudspeaker-room-microphone impulse responses in the far end 704, $g_1(t)$ and $g_2(t)$, respectively. One prior art approach uses non-linear modification of the two microphone channels which breaks the linear relationship between the two microphone channels and decreases the correlation between the two. This prior art approach adds some non-linear distortion which can produce audible artifacts for a range of signals. In contrast, the approaches disclosed herein use a different design for differential microphone arrays as the acoustic front end for stereophonic hands-free communications systems to achieve a sufficient amount of decorrelation for stereophonic acoustic echo cancellation.

The original signals from the far end 704 microphones 706, 708 are processed 724, 726 and combined 728, 730, 732 with the signal picked up by the microphone(s) 720, 722 at the near end 702 in order to cancel stereophonic echoes in the signal picked up by the microphone(s) 720, 722 at the near end 702. The speaker(s) 734, 736 at the far end outputs the resulting signal that has the stereophonic echoes cancelled out.

Figure 9:
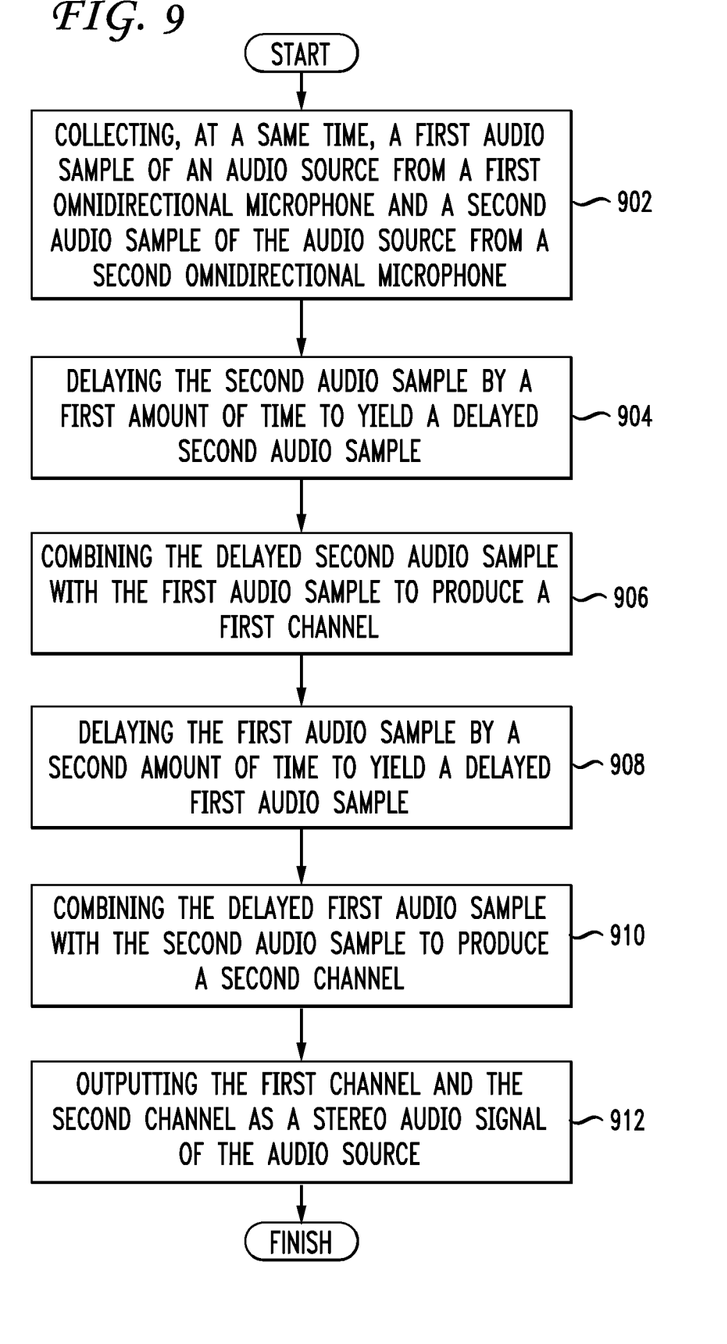
FIG. 9 illustrates an exemplary method embodiment.

The disclosure now turns to the exemplary method embodiment as illustrated in FIG. 9. For the sake of simplicity, the method is discussed in terms of a system 100 as shown in FIG. 1 configured to practice the method. The system can include software to (1) collect an audio sample from each microphone at the same time instant, (2) take the output sample of microphone one and delay that sample by a certain amount of time, (3) take the output sample of microphone two without adding any delay, and (4) subtract the two samples obtained in steps 1 and 2. Then, the software can (5) perform steps 2-4 in parallel with the roles of the two microphones reversed, and (6) repeat steps 1-5 for a next audio sample or stream. These steps are set forth in more detail below.

The system 100 collects, at a same time, a first audio sample of an audio source from a first omnidirectional microphone and a second audio sample of the audio source from a second omnidirectional microphone (902). The first omnidirectional microphone and the second omnidirectional microphone can be closely spaced, such as approximately one centimeter apart. The microphones can be positioned with a smaller or larger spacing. Due to the close proximity of the omnidirectional microphones, a single telephone housing can easily incorporate both omnidirectional microphones.

The system 100 delays the second audio sample by a first amount of time to yield a delayed second audio sample (904) and combines the delayed second audio sample with the first audio sample to produce a first channel (906). The system 100 delays the first audio sample by a second amount of time to yield a delayed first audio sample (908) and combines the delayed first audio sample with the second audio sample to produce a second channel (910). The first amount of time and the second amount of time can be equal or unequal. Different delay values can produce different results in the stereophonic echo cancellation. The system 100 can combine audio samples by applying a spatial Fourier transform.

The system 100 outputs the first channel and the second channel as a stereo audio signal of the audio source (912). The stereo audio signal can simulate a first-order pattern, such as a cardioid or cardioid-like pattern. Optionally, the system 100 can audibly play the stereo audio signal via a first speaker and a second speaker. The fundamental result of utilizing the sound capture techniques described herein is that no dedicated decorrelation step is required. Simulations and real-time tests provide a strong indication that post-processing the microphone signals using signal decorrelation methods such as nonlinearities is not required when a back-to-back cardioid arrangement is used as the acoustic front-end to stereophonic acoustic echo cancellation systems for spatial sound pickup.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the stereo recording technique disclosed herein can have application in movie production and playback, speaker phones and conference call equipment, video games, smartphones, dictation, car stereos, Bluetooth and other headsets, desktop phones, soft phones, webcams, and so forth. Those skilled in the art will readily recognize various modifications and changes that may be made to the principles described herein without following the example embodiments and applications illustrated and described herein, and without departing from the spirit and scope of the disclosure.

I claim:

1. A method comprising:
   collecting, at a same time, a first audio sample of an audio source from a first omnidirectional microphone and a second audio sample of the audio source from a second omnidirectional microphone;
   delaying the second audio sample by a first amount of time, to yield a delayed second audio sample;
   combining the delayed second audio sample with the first audio sample to produce a left channel $\tilde{X}_1(\omega)$, wherein $\tilde{X}_1(\omega) = S(\omega)[e^{idk/2 \cos \phi_1} - e^{-i(\phi T_1 + kd/2 \cos \phi_1)}]$, wherein d is a distance between the first omnidirectional microphone and the second omnidirectional microphone, wherein a first delay $T_1 = d/c \cdot \cos \phi_1$ is chosen to produce a back-to-back cardioid pattern that provides correlated signals for a direction-of-arrival from the audio source to a mid-point between the first omnidirectional microphone and the second omnidirectional microphone, and wherein c is a speed of sound;

delaying the first audio sample by a second amount of time, to yield a delayed first audio sample, wherein the second amount of time is a distinct duration from the first amount of time;

combining the delayed first audio sample with the second audio sample to produce a right channel $\tilde{X}_2(\omega)$, wherein $\tilde{X}_2(\omega) = S(\omega)[e^{-idk/2 \cos \phi_2} - e^{-i(\omega T_2 - kd/2 \cos \phi_2)}]$, wherein a second delay $T_2 = d/c \cdot \cos \phi_2$ is chosen to produce the back-to-back cardioid pattern; and outputting the left channel and the right channel as a stereo audio signal of the audio source.

2. The method of claim 1, wherein the first omnidirectional microphone and the second omnidirectional microphone are approximately fifty centimeters apart.

3. The method of claim 1, wherein closely spaced is approximately one centimeter apart.

4. The method of claim 1, wherein the stereo audio signal simulates a first-order pattern.

5. The method of claim 4, wherein the first-order pattern is a cardioid pattern.

6. The method of claim 1, wherein the first omnidirectional microphone and the second omnidirectional microphone are incorporated as part of a single telephone housing.

7. The method of claim 1, further comprising audibly playing the stereo audio signal via a first speaker and a second speaker.

8. The method of claim 1, wherein combining audio samples comprises applying a spatial Fourier transform of length two, and wherein the second audio sample is not delayed when combined with the delayed first audio sample, the left channel and the right channel comprising two back-to-back cardioid patterns obtained via differential microphone array.

9. A system comprising:
a processor; and
a computer-readable storage device storing instructions which, when executed by the processor, cause the processor to perform operations comprising:
collecting, at a same time, a first audio sample of an audio source from a first omnidirectional microphone and a second audio sample of the audio source from a second omnidirectional microphone;
delaying the second audio sample by a first amount of time, to yield a delayed second audio sample;
combining the delayed second audio sample with the first audio sample to produce a left channel $\tilde{X}_1(\omega)$, wherein $\tilde{X}_1(\omega) = S(\omega)[e^{idk/2 \cos \phi_1} - e^{-i(\phi T_1 + kd/2 \cos \phi_1)}]$, wherein d is a distance between the first omnidirectional microphone and the second omnidirectional microphone, wherein a first delay $T_1 = d/c \cdot \cos \phi_1$ is chosen to produce a back-to-back cardioid pattern that provides correlated signals for a direction-of-arrival from the audio source to a mid-point between the first omnidirectional microphone and the second omnidirectional microphone, and wherein c is a speed of sound;
delaying the first audio sample by a second amount of time, to yield a delayed first audio sample, wherein the second amount of time is a distinct duration from the first amount of time;
combining the delayed first audio sample with the second audio sample to produce a right channel $\tilde{X}_2(\omega)$, wherein $\tilde{X}_2(\omega) = S(\omega)[e^{-idk/2 \cos \phi_2} - e^{-i(\omega T_2 - kd/2 \cos \phi_2)}]$, wherein a second delay $T_2 = d/c \cdot \cos \phi_2$ is chosen to produce the back-to-back cardioid pattern; and
outputting the left channel and the right channel as a stereo audio signal of the audio source.

10. The system of claim 9, wherein the first omnidirectional microphone and the second omnidirectional microphone are approximately fifty centimeters apart.

11. The system of claim 10, wherein closely spaced is approximately one centimeter apart.

12. The system of claim 9, wherein the stereo audio signal simulates a first-order pattern.

13. The system of claim 12, wherein the first-order pattern is a cardioid pattern.

14. The system of claim 9, wherein the first omnidirectional microphone and the second omnidirectional microphone are incorporated as part of a single telephone housing.

15. A computer-readable storage device storing instructions which, when executed by a processor, cause the processor to perform operations comprising:
collecting, at a same time, a first audio sample of an audio source from a first omnidirectional microphone and a second audio sample of the audio source from a second omnidirectional microphone;
delaying the second audio sample by a first amount of time, to yield a delayed second audio sample;
combining the delayed second audio sample with the first audio sample to produce a left channel $\tilde{X}_1(\omega)$, wherein $\tilde{X}_1(\omega) = S(\omega)[e^{idk/2 \cos \phi_1} - e^{-i(\phi T_1 + kd/2 \cos \phi_1)}]$, wherein d is a distance between the first omnidirectional microphone and the second omnidirectional microphone, wherein a first delay $T_1 = d/c \cdot \cos \phi_1$ is chosen to produce a back-to-back cardioid pattern that provides correlated signals for a direction-of-arrival from the audio source to a mid-point between the first omnidirectional microphone and the second omnidirectional microphone, and wherein c is a speed of sound;
delaying the first audio sample by a second amount of time, to yield a delayed first audio sample, wherein the second amount of time is a distinct duration from the first amount of time;
combining the delayed first audio sample with the second audio sample to produce a right channel $\tilde{X}_2(\omega)$, wherein $\tilde{X}_2(\omega) = S(\omega)[e^{-idk/2 \cos \phi_2} - e^{-i(\omega T_2 - kd/2 \cos \phi_2)}]$, wherein a second delay $T_2 = d/c \cdot \cos \phi_2$ is chosen to produce the back-to-back cardioid pattern; and
outputting the left channel and the right channel as a stereo audio signal of the audio source.

16. The computer-readable storage device of claim 15, wherein the first omnidirectional microphone and the second omnidirectional microphone are incorporated as part of a single telephone housing.

17. The computer-readable storage device of claim 15, the instructions further comprising audibly playing the stereo audio signal via a first speaker and a second speaker.

18. The computer-readable storage device of claim 15, wherein combining audio samples comprises applying a spatial Fourier transform, and wherein the second audio sample is not delayed when combined with the delayed first audio sample.

* * * * *